July 4, 1939.  F. R. McDEVITT  2,164,686
INNER WALLED TIRE
Filed April 24, 1937
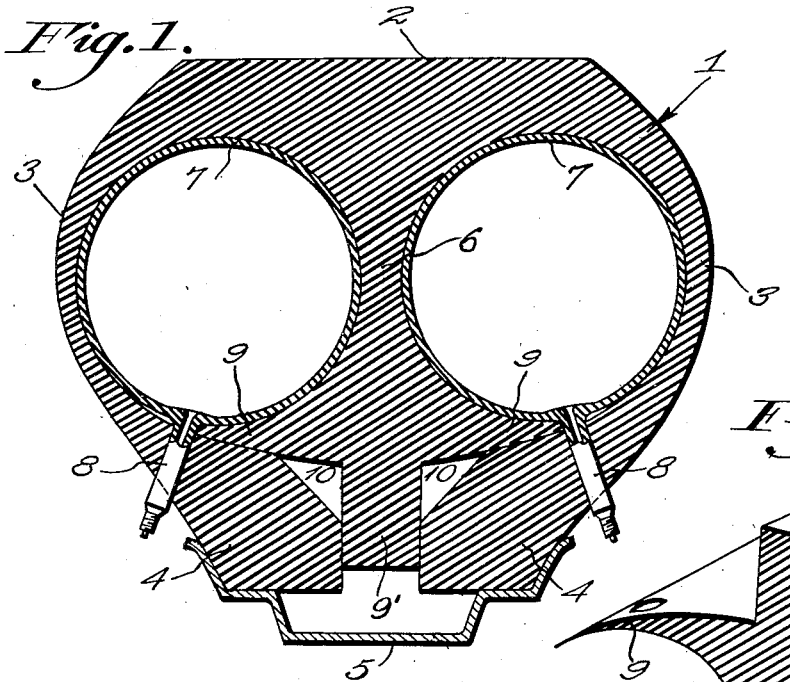
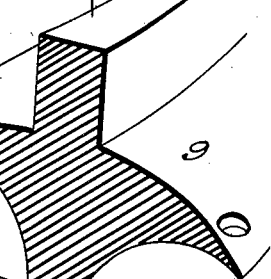
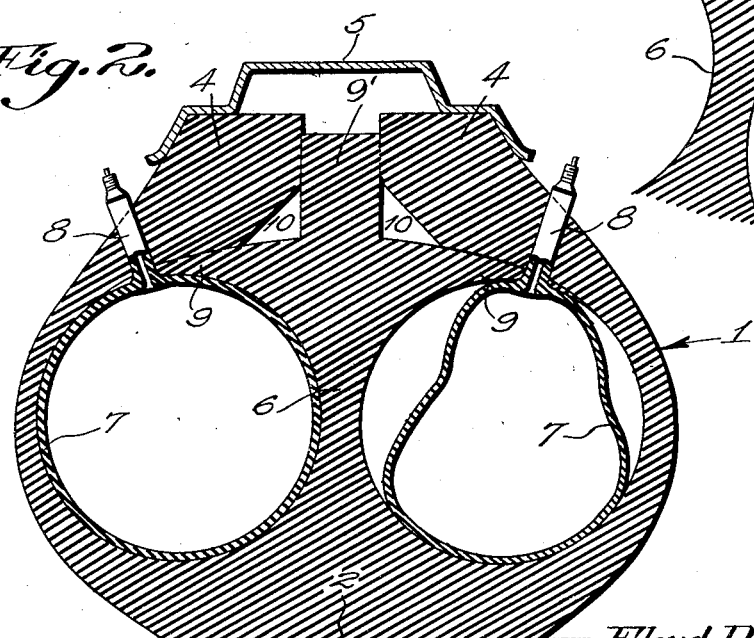
Floyd R. McDevitt
INVENTOR
BY Victor J. Evans & Co.
ATTORNEYS
WITNESS Patented July 4, 1939

2,164,686

UNITED STATES PATENT OFFICE 2,164,686

INNER WALLED TIRE

Floyd Raymond McDevitt, Omaha, Nebr.

Application April 24, 1937, Serial No. 138,849

1 Claim. (Cl. 152—340)

This invention relates to pneumatic tires especially adapted to provide safety in case of punctures and has for the primary object the provision of a tire of the above stated character which accommodates a pair of inflatable inner tubes kept separately from each other and either of which will sustain the tire against collapsing in case of a puncture of either of said tubes, thereby eliminating quick and complete deflation of the tire and accidents incident thereto in case of a puncture.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a transverse sectional view illustrating a tire constructed in accordance with my invention.

Figure 2 is a view similar to Figure 1 showing one of the inner tubes deflated.

Figure 3 is a fragmentary perspective view illustrating a partition forming an integral part of the tire.

Referring in detail to the drawing, the numeral 1 indicates a shoe of a pneumatic tire including a tread portion 2, side walls 3 and beads 4. The beads 4 are received in the usual manner by a rim 5 of a wheel. Integral with the tread portion 2 is a partition 6 cooperating with said tread portion and the side walls 3 in forming chambers to receive inflatable inner tubes 7, the inflating valves 8 of which extend through openings formed in the side walls 3 adjacent the beads 4. The partition 6 is received freely between the beads 4 and is capable of moving relative thereto during the flexing of the shoe. The inner portion of the partition 6 is of an increased thickness to form flanged portions 9. The flanged portions extend laterally in opposite directions to each other for disposal within the chamber and are beveled toward the outer edges thereof to fit and contact the walls 3 of the shoe along the junctures thereof with the beads 4 which are held within the flanges of the rim 5, by a rib 9' formed on and extending inwardly from the inner portion of the partition for disposal in the space 10 to act as abutting means for the beads, as clearly shown in Figures 1 and 2 between the beads 4 of the shoe and the partition. The flanged portions 9 are apertured to permit the inflating valves 8 to extend therethrough.

Normally the inner tubes are inflated to approximately the same air pressure and should a nail or similar object penetrate the shoe by way of the tread portion, the chances are that it will puncture one of the inner tubes so that it becomes deflated, as shown in Figure 2. The other inner tube being undamaged will sustain the shoe and prevent complete collapsing thereof under a load so that all danger of quick or rapid collapsing of the shoe is obviated which will eliminate accidents heretofore caused by the rapid collapsing of tires now in general use, when the inner tubes thereof become punctured.

What is claimed is:

A pneumatic tire comprising a shoe including a tread portion, side walls and rim flange receiving beads, a partition integral with the tread portion and extending inwardly and centrally therefrom to cooperate with the side walls and tread portion to provide chambers for receiving inflatable inner tubes, said partition having its inner portion increased in thickness to form oppositely disposed laterally directed flanges extending within the chambers and being beveled to fittingly engage with the side walls along the juncture thereof with the beads, a rib formed on and extending centrally from the flanged portion of the partition and disposed between the beads to hold the latter engaged with the flanges of the rim, said side walls having openings therein at the juncture thereof with the beads, and said flanges being apertured adjacent the outer edges thereof for registration with the openings in the side walls for receiving valve stems of the tubes.

FLOYD RAYMOND McDEVITT.